United States Patent
Hoekstra et al.

(10) Patent No.: US 9,323,602 B2
(45) Date of Patent: Apr. 26, 2016

(54) ERROR CORRECTION WITH EXTENDED CAM

(71) Applicant: FREESCALE SEMICONDUCTOR, INC., Austin, TX (US)

(72) Inventors: George P. Hoekstra, Austin, TX (US); Ravindraraj Ramaraju, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 12 days.

(21) Appl. No.: 14/159,266

(22) Filed: Jan. 20, 2014

(65) Prior Publication Data

US 2014/0201597 A1 Jul. 17, 2014

(51) Int. Cl.
*G11C 29/00* (2006.01)
*G06F 11/10* (2006.01)

(52) U.S. Cl.
CPC ............ *G06F 11/10* (2013.01); *G06F 11/1048* (2013.01)

(58) Field of Classification Search
None
See application file for complete search history.

(56) References Cited

U.S. PATENT DOCUMENTS

| | | | | |
|---|---|---|---|---|
| 5,524,231 | A * | 6/1996 | Brown | 711/101 |
| 5,996,096 | A * | 11/1999 | Dell et al. | 714/710 |
| 6,434,033 | B1 * | 8/2002 | Chien | 365/49.1 |
| 7,562,283 | B2 | 7/2009 | Falik et al. | |
| 7,624,313 | B2 * | 11/2009 | Wickeraad et al. | 714/710 |
| 7,930,612 | B2 | 4/2011 | Radke et al. | |
| 7,962,809 | B1 * | 6/2011 | Sutardja et al. | 714/718 |
| 8,266,498 | B2 | 9/2012 | Moyer | |
| 8,621,326 | B2 * | 12/2013 | Uchibori | 714/766 |
| 2003/0217321 | A1 * | 11/2003 | Hsu et al. | 714/763 |
| 2010/0107037 | A1 * | 4/2010 | Pelley et al. | 714/763 |
| 2011/0219284 | A1 | 9/2011 | Uchikawa | |
| 2011/0307769 | A1 * | 12/2011 | Ramaraju et al. | 714/801 |
| 2012/0110411 | A1 * | 5/2012 | Cheung et al. | 714/758 |
| 2012/0233498 | A1 | 9/2012 | Ramaraju et al. | |
| 2012/0254686 | A1 | 10/2012 | Esumi | |

OTHER PUBLICATIONS

Chen, T., et al., "An Adaptive-Rate Error Correction Scheme for NAND Flash Memory", 2009 27th IEEE VLSI Test Symposium, pp. 53-58.
U.S. Appl. No. 14/266,202, filed Apr. 30, 2014, entitled "Error Correction with Secondary Memory".
Ankolekar, "Multibit Error-Correction Methods for Latency-Constrained Flash Memory Systems," IEEE Transactions on Device and Materials Reliability; Mar. 2010; vol. 10, Issue 1; pp. 33-39.
Kgil, "Improving NAND Flash Based Disk Caches," Computer Architecture, Jun. 21-25, 2008; Beijing; pp. 327-338.
Tanakamaru, "Post-manufactureing, 17-times acceptable ray bit error rate enhancement, dynamic codeword transition ECC scheme for highly reliable solid-state drives, SSDs" IEEE International Memory Workshop; May 16-19, 2010; Seoul; pp. 1-4.
Wang, "Hierarchical Decoding of Couble Error Correcting Codes for High Speed Reliable Memories," Design Automation Conference (DAC), May 29-Jun. 7, 2013; Austin, TX; pp. 1-7.

* cited by examiner

*Primary Examiner* — Daniel McMahon

(57) ABSTRACT

A memory system includes a memory and a content addressable memory (CAM). The memory includes a plurality of address locations, wherein each address location configured to store data and one or more error correction bits corresponding to the data. The CAM includes a plurality of entries, wherein each entry configured to store an address value of an address location of the memory and one or more extended error correction bits corresponding to the data stored at the address location of the memory.

18 Claims, 6 Drawing Sheets

ERROR CORRECTION WITH EXTENDED CAM

FIELD

This disclosure relates generally to memory error correction, and more specifically, to a mechanism for extending memory used by error correction code.

BACKGROUND

As production geometries of processor systems with their associated memories decrease, the opportunities for defects in the finished products increase. These defects, along with other physical events (e.g., cosmic ray passage), can result in increasing bit error rates in system memories. Along with increasing single bit error rates are the increasing probability of double bit errors in a given area of memory.

Today's high density memories can be subject to increased incidents of bit errors than lower density memories. Process technologies used to manufacture high density memories can result in defects that cause persistent weak bits. Further, multiple neighboring bits can be subject to these defects due to processing. In addition, transient bit errors can affect multiple neighboring bits in high-density memories.

Single bit error correction methods have been used to correct occurrences of errors in a single bit of an area of memory. Single bit error correction methods, such as Hamming code methods, are attractive because they can be performed in a manner that has a minimal impact on memory latency (e.g., in a single clock cycle). But single bit error correction methods cannot correct both a transient bit error and a persistent weak bit error occurring in the same area of memory. In a circumstance where a region of memory has a double bit (or higher) error, and only single bit error correction is used, that region of memory will require reloading from a data source to correct the error. Such reloading increases memory latency due to cycles spent requesting, reading, and loading the data from the source to the region of memory.

To resolve issues related to double bit errors, polynomial code based error correction methods, such as Bose-Chaudhuri-Hocquenghem (BCH) code, can be used. These double bit error correction methods have an advantage over single bit error correction methods in that they can significantly improve memory reliability. For example, double bit error correction methods can correct both a transient bit error and a persistent weak bit error in a same area of memory. While double bit error correction methods are robust, the process of determining the location of the errors and correcting the errors are non-trivial and can result in significantly longer memory latencies than those found in single bit error correction methods. Thus, traditionally, a tradeoff has been required between memory latency and memory reliability through correction of higher numbers of bit errors.

Each word or entry in non-volatile memory has a fixed number of bits that includes a data portion and a number of spare bits for parity data. As flash memory is reprogrammed over a number of cycles, correction of higher numbers of bit errors requires more correction capability with a corresponding increase in the number of parity bits. If the number of bits allocated for parity increases, the number of bits available for storing data is reduced.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

Embodiments of the present invention provide an extended memory that can be used to store additional information such as parity bits for error correction codes that require more space than typically allocated for error correction information in a non-volatile memory entry. Instead of reducing the number of bits allocated to data and increasing the number of bits allocated to error correction information in the NVM entry, a fixed number of bits are allocated to data and to error correction information, and any additional error correction information for the NVM entry is stored in the extended memory. The extended memory allows more powerful error correction codes to be used for the NVM without reducing the amount of space available for storing data in each entry in the NVM. The extended memory can be implemented using a volatile memory device that is external to the NVM where the data is stored. The information in the extended memory can be written and saved in the NVM device when the system is powered down and restored from the NVM device when the system is powered-up.

Figure 1:
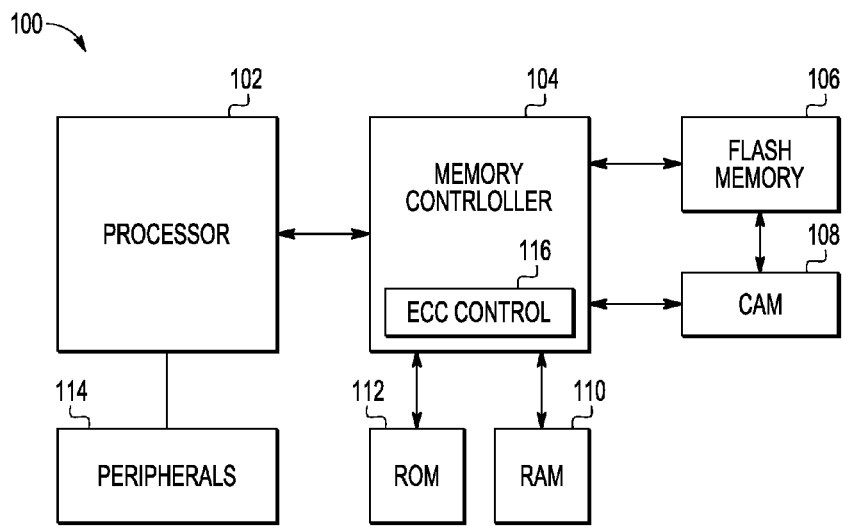
FIG. 1 illustrates a data processing system usable with embodiments of the present invention.

FIG. 1 is a simplified block diagram illustrating a data processing system 100 usable with embodiments of the present invention. Data processing system 100 includes a processor 102, a memory controller 104 with error correction code (ECC) control 116, non-volatile memory 106 such as flash memory, content addressable memory (CAM) 108, random access memory (RAM) 110, read-only memory (ROM) 112, and peripheral modules 114. The processor 102 is coupled to communicate with the peripheral modules 114 and memory controller 104 over one or more buses. Memory Controller 104 is coupled to communicate with flash memory 106, CAM 108, RAM 110 and ROM 112 via one or more buses. CAM 108 can be implemented using static random access memory (SRAM), NOR flash, or other suitable non-volatile memory.

ECC control 116 can provide both error encoding and error decoding functionality. As data is received from memory (e.g., flash memory 106, RAM 110 or ROM 112) or processor 102, ECC control 116 can generate parity bits for use in subsequent error checking and correction. The mechanism for generating the parity bits is associated with the method used for decoding those parity bits during subsequent memory access and accompanying error correction and detection. For each address, both the data retrieved from memory (or generated by processor) and a fixed number of parity bits associated with the data are stored in an entry. Some of the parity bits are stored in flash memory 106 in association with their related data. When the number of parity bits needed for a particular ECC exceeds the space allocated for parity bits in flash memory 106, the additional parity bits can be stored in CAM 108. For example, the parity bits in the flash memory 106 entry can be used for relatively simple error correction codes, such as single bit errors, but when more complex errors, such as multiple bit errors, are detected in flash memory 106, the additional parity bit required by more powerful error correction codes can be stored in CAM 108.

The number of bits in the flash memory 106, and the size and number of memory segments, can vary depending upon the implementation of system 100. The inventive concepts described herein are not limited to any particular size of memory region or memory segment. Further, embodiments of the invention are not limited solely to correction of any particular type of memory (e.g., flash memory).

Figure 2:
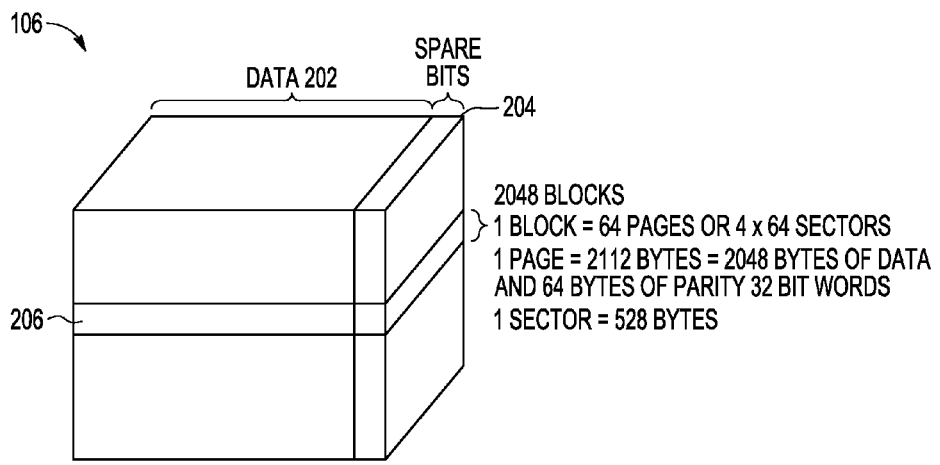
FIG. 2 illustrates an embodiment of a non-volatile memory with space for data and parity information for each entry in the non-volatile memory that can be used in the data processing system of FIG. 1.

FIG. 2 illustrates an embodiment of flash memory 106 that can be used in the data processing system of FIG. 1 including data bits portion 202 for storing data for each entry in memory 106 and spare bits portion 204 for storing parity information for each entry in memory 106. Flash memory 106 can be divided into two or more segments and sub-segments 206 such as blocks, pages, sectors, or other suitable divisions. In the example shown, flash memory 106 includes 2048 blocks. Each block can be divided into a number of pages, for example, 64 pages with each page including 2112 bytes. Alternatively, each block can be divided into a number of sectors, for example, 256 sectors with each sector including 528 bytes. As used herein, the term "segment" can refer to a page, a sector, or any other suitable division of flash memory 106.

Memory cells in flash memory 106 can be programmed and erased multiple times. As the number of program/erase cycles increases, some of the memory cells may require increased voltages during program and/or erase operations. In some cases, one or more of the cells may fail during a program or erase operation. The number of bits that fail may increase as flash memory 106 ages. In other cases, one or more transmission errors may occur when the data is sent to flash memory 106, causing one or more bits in the data to be dropped or scrambled. In these cases, an error correction code can be used to detect whether there is an error in the data, and to correct the data if there is an error. Spare bits 204 are reserved for each entry, but it is desirable to keep the number of spare bits 204 to a minimum so that more space is available to hold data in data portion 202.

Figure 3:
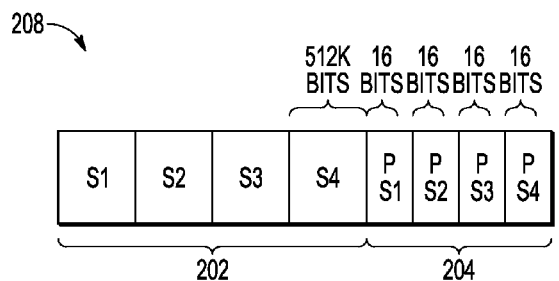
FIG. 3 illustrates an embodiment of an entry in the non-volatile memory of FIG. 2.

Some of the bits in each segment 206 are allocated to data portion 202 and the rest of the bits are allocated to spare bits portion 204. FIG. 3 illustrates an embodiment of segment 206 of flash memory 102 that includes four sectors S1-S4 in data portion 202 and 16 parity bits for each sector S1-S4 in spare bits portion 204. Each sector S1-S4 includes a number of words of data. A word can include 8, 16, 32, 64 or other suitable number of bits. A parity bit is added to a group of bits to indicate whether the number of bits in the group with a value of one or zero is even or odd. If the parity matches the actual data, then no error is detected. If the parity does not match the actual data, then an error is detected and can be corrected using correction logic in ECC control 116 (FIG. 1). In the example shown, each sector S1-S4 includes 512 kilobytes in data portion 202 and 16 bits in parity portion 204. In other embodiments, each sector S1-S4 could include another suitable number of bits is data portion 202 and parity portion 204, however, it is noted that if additional space is required to use more complex error correction codes, the space allocated in data portion 202 and parity portion 204 can remain the same while the additional information for the error correction code can be stored in CAM 108 (FIG. 1).

Figure 4:
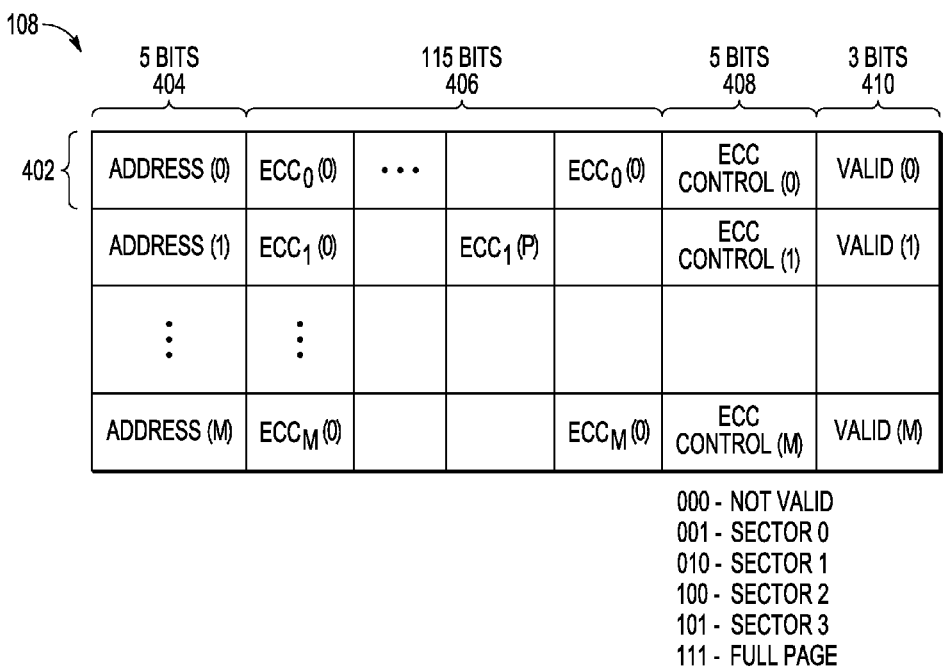
FIG. 4 illustrates an example of a content addressable memory (CAM) with extended error correction code information, usable to implement embodiments of the present invention.

With reference to FIGS. 1 and 4, FIG. 4 illustrates an example of CAM 108 with extended error correction code (ECC) information, usable to implement embodiments of the present invention. CAM 108 includes a number of entries 402, with each entry 402 including an address field 404, one or more error correction bits field 406, an ECC control field 408, and an entry valid field 410. Note that entries 402 can include other fields in addition to or instead of those shown in the example. In the example shown, address field 404 includes 5 bits, extended error correction bits fields 406 includes 115 bits, ECC control field 408 includes 5 bits, and entry valid field 410 includes 3 bits, but fields 406-410 can include any suitable number of bits.

Address field 404 is used to store the address of the data in flash memory 106 (FIG. 1) for which the ECC type indicated in ECC field 406 will be used.

ECC control field 408 identifies a subset of the one or more extended error correction bits in error correction bits fields 406 to be used, and a type of error correction code corresponding to the subset of the extended error correction bits fields 406. Each subset of the extended error correction bits fields 406 can include as many bits as required by a particular type of ECC. For example, one type of ECC may require 20 extended error correction bits, with another type of ECC may require only 10 extended error correction bits.

During a read access of flash memory 106, single bit error correction and double bit error detection (SEC-DED) is performed on each of the memory segments. Such SEC-DED can be performed using a linear error-correcting code such as a Hamming code or other suitable ECC. SEC-DED Hamming codes can detect up to two bit errors in a segment and correct single bit errors.

If no double bit errors in any of the memory segments are detected, then the corrected data can be used to update flash memory 106 and to service the access request. For example, if no double bit errors are detected in any segment, the corrected data can be provided back to memory controller 104 to service the access request. If, however, a double bit error is detected in any of the memory segments, a determination is then made whether to reload the data from system memory such as ROM 112 or RAM 110 if the data has not been modified, or to otherwise handle the error if the data has been modified (e.g., reboot the system). The address of the segment placed in the CAM along with new redundancy bits determined by the error correction scheme chosen.

Note that the scope of embodiments of the present invention is not limited to specific error correction and detection methods.

In order to perform such error correction and detection, a first set of parity bits are stored in flash memory 106 with each memory segment during error encoding. The number of parity bits is dependent upon the size of the memory segment and the type of error correction used. For example, for a 512 bit memory segment, an additional 3 parity bytes are used. In embodiments of the present invention, the additional parity bits for one or more alternative ECCs such as DEC-TED codes, can be stored in CAM 108, thus providing flexibility in correcting errors while retaining sufficient space in flash memory 106 to store data.

Validity field 410 can indicate the segment of flash memory 106 for which the entry is valid. For example, the validity field 410 can be set to 000 when not valid, 001 when valid for sector 1, 010 when valid for sector 2, 100 when valid for sector 3, 101 when valid for sector 4 and 111 when valid for an entire page. Other settings and other segments of flash memory 106 can be used, however.

Figure 5:
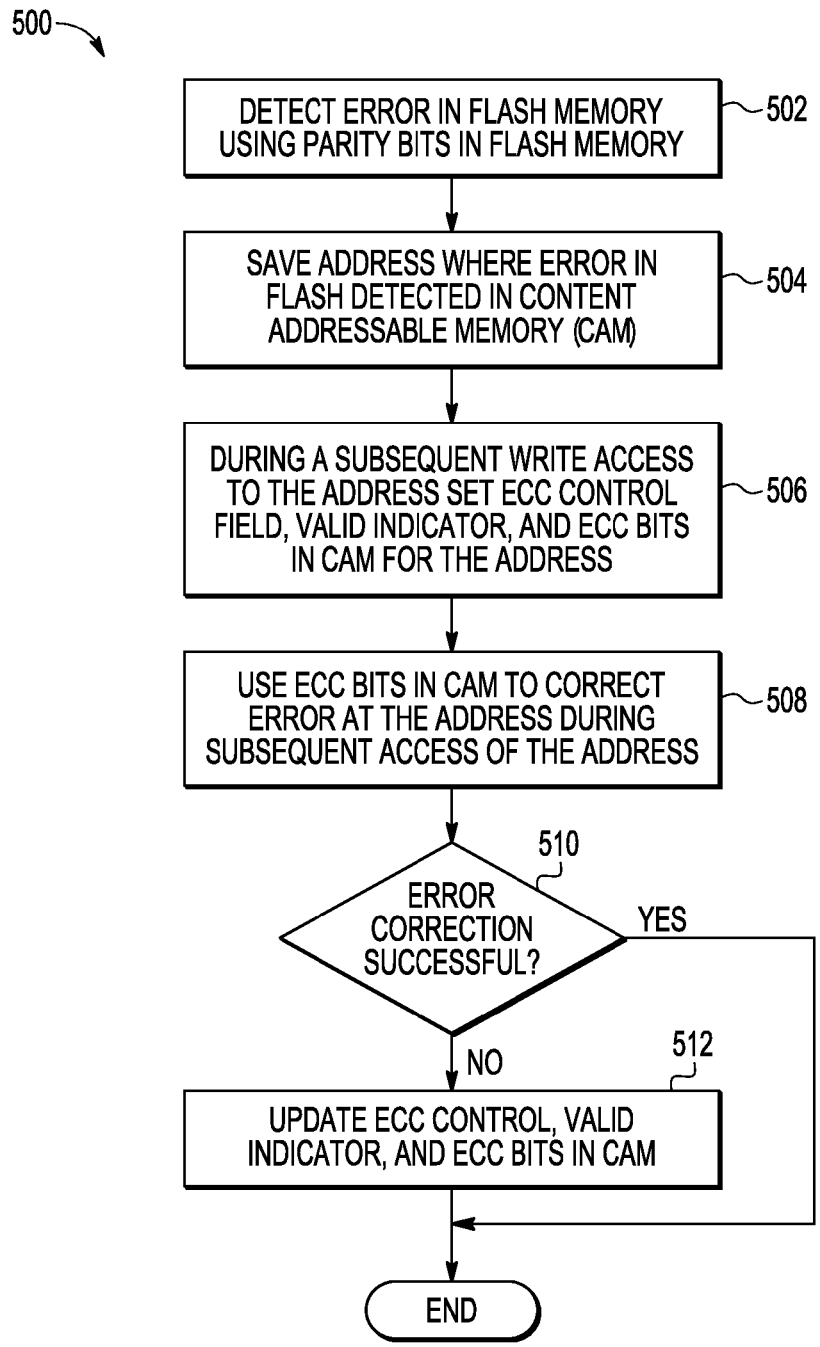
FIG. 5 illustrates a block diagram of an embodiment of a method for using the CAM in the system of FIG. 1.

Referring to FIGS. 1 and 5, FIG. 5 illustrates a block diagram of an embodiment of a method 500 for using extended CAM 108 in the system 100. Method 500 can be performed by one or more components of a memory controller 104 incorporating error control circuitry configured to implement embodiments of the present invention, for example, ECC control 116. When a message containing a memory access address is received by memory controller 104 that matches data in flash memory 106, the matching segment of flash memory 106 is read and a first level of error correction and detection is performed on the segment in process 502. As discussed above, for a SEC-DED analysis, a first set of parity bits are generated when the data is stored in flash memory 106 and used when the initial error analysis is performed. In the case of a sector of 512 bytes, the number of parity bytes used for a SEC-DED Hamming code is three and single bit errors in each sector are corrected. In addition, any double bit errors are detected. In scenarios where higher error rates are anticipated, it may be advantageous to use double error correcting and triple error detecting polynomial codes, for example, as a first level of error correction. This added correction capability could increase latency and complexity on all accesses to the non-volatile memory.

If more bit errors than can be corrected are detected in a segment (e.g., a SEC-DED code detects a double bit error), then the address where the error is detected is saved in CAM 108 in process 504. During a subsequent write access to the address where the error was detected, the extended ECC parity bits, ECC control field, and valid indicator in the entry in CAM 108 corresponding to the address are set in process 506. The ECC control field indicates the type of ECC and identifies a subset of the extended ECC parity bits to be used to correct the errors. The valid indicator is set to indicate the segment of memory for which the entry is valid.

In process 508, when the address in flash memory 106 matches an entry in CAM 108 during subsequent access of the address, the extended ECC parity bits in CAM 108 are used to correct the error(s) at the address. Process 510 determines whether the error correction was successful, and if not, process 512 updates the extended ECC control bits, ECC control bits, and valid bits in the corresponding entry in CAM 108. If the error(s) were correctly successfully, the information in the CAM entry remains unchanged.

Figure 6:
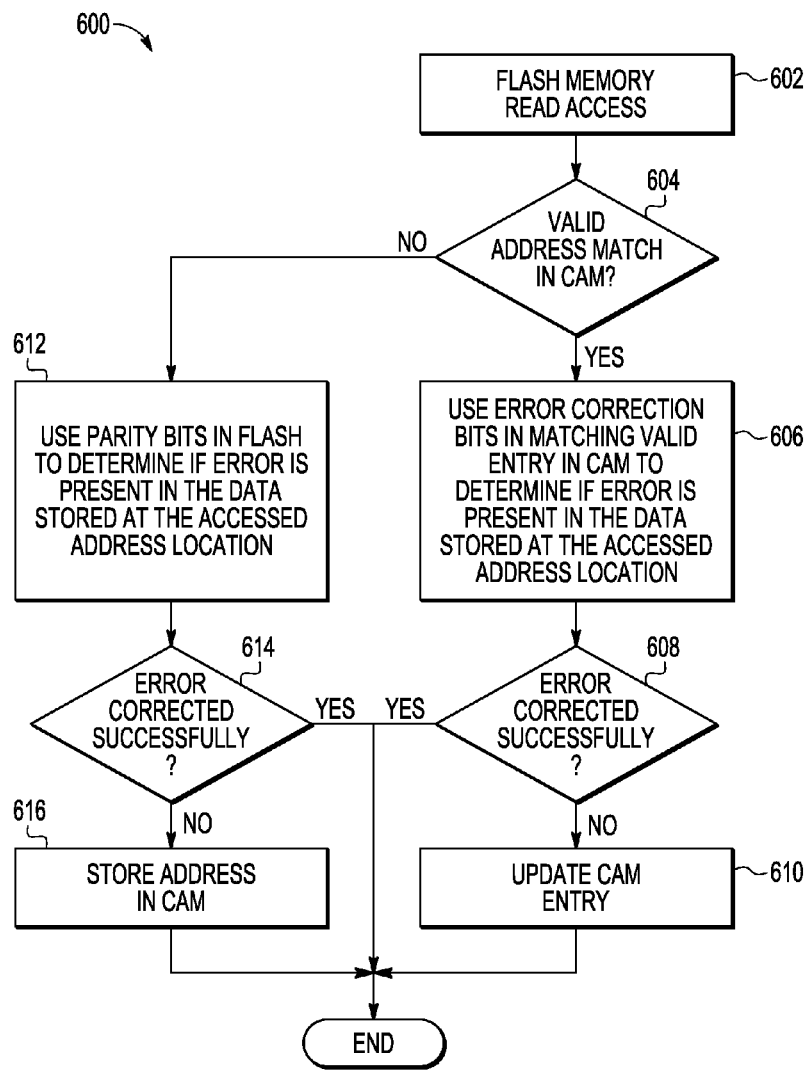
FIG. 6 illustrates an embodiment of a method for performing a read memory access using main and extended error correction code, usable in embodiments of the system of FIG. 1.

Referring to FIGS. 1 and 6, FIG. 6 illustrates an embodiment of a method 600 for performing a read memory access using main and extended error correction code, usable in embodiments of system 100 of FIG. 1. In process 602, a message containing a memory read access address is received by memory controller 104. Process 604 determines whether the address matches the address of a valid entry in CAM 108. If there is a match with the address in an entry in CAM 108, process 606 includes using the extended error correction bits in the matching valid entry to determine if an error is present and to correct the error in the data stored at the corresponding address location in flash memory 606. Process 608 determines whether the error correction was successful, and if not, process 610 updates the extended ECC control bits, ECC control bits, and valid bits in the corresponding entry in CAM 108. If the error(s) were correctly successfully, the information in the CAM entry remains unchanged.

Referring again to process 604, if there is not a match with the address in the entry in CAM 108, process 612 includes using the error correction bits in flash memory 106 to determine if an error is present and to correct the error in the data stored in flash memory 106. Process 614 determines whether the error correction was successful, and if not, process 616 stores the address in CAM 108. If the error(s) were correctly successfully in process 612, the information in the CAM entry remains unchanged.

Figure 7:
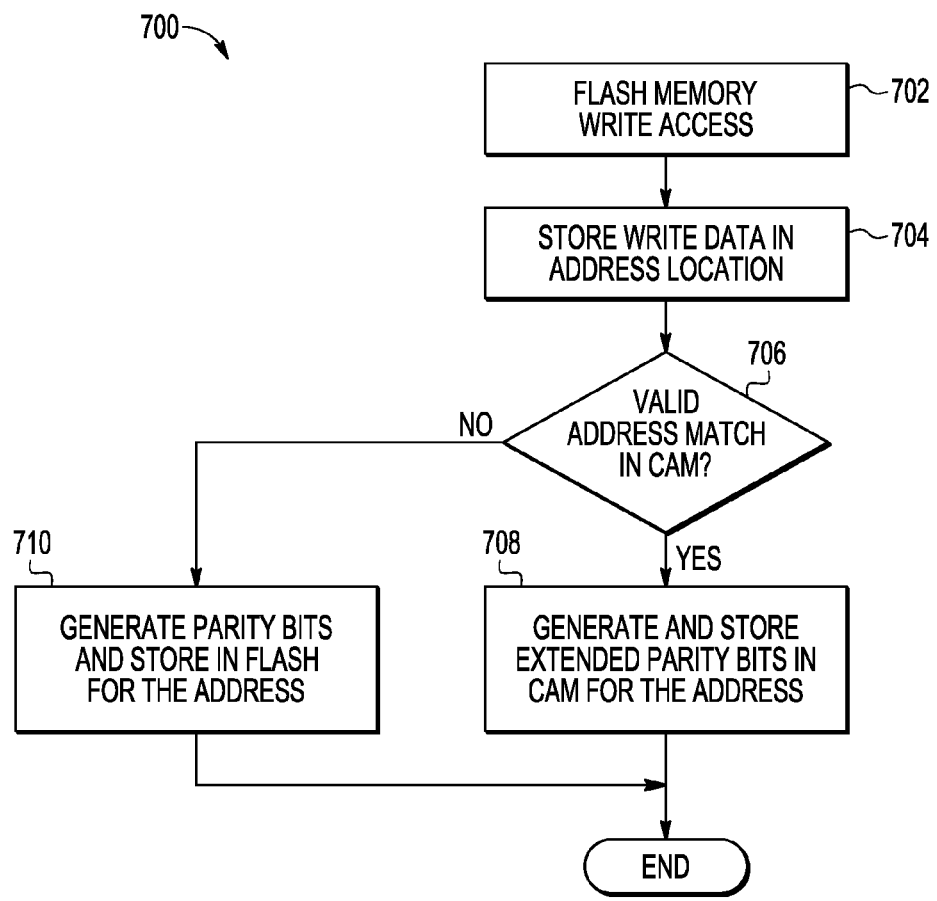
FIG. 7 illustrates an embodiment of a method for performing a write memory access using main and extended error correction code, usable in embodiments of the system of FIG. 1.

FIG. 7 illustrates an embodiment of a method for performing a write memory access using main and extended error correction code, usable in embodiments of system 100 of FIG. 1. In process 702, a message containing a memory write access address is received by memory controller 104. Process 704 stores the write data in the address location in flash memory 106. Process 706 determines whether the address matches the address of a valid entry in CAM 108. If there is a match with the address in an entry in CAM 108, process 708 generates and stores the extended error correction bits and the ECC control bits in the matching valid entry for the address in CAM 108. If there is not a match with the address in the entry in CAM 108, process 710 generates and stores the error correction bits in the spare bits 204 (FIG. 2) of flash memory 106.

Figure 8:
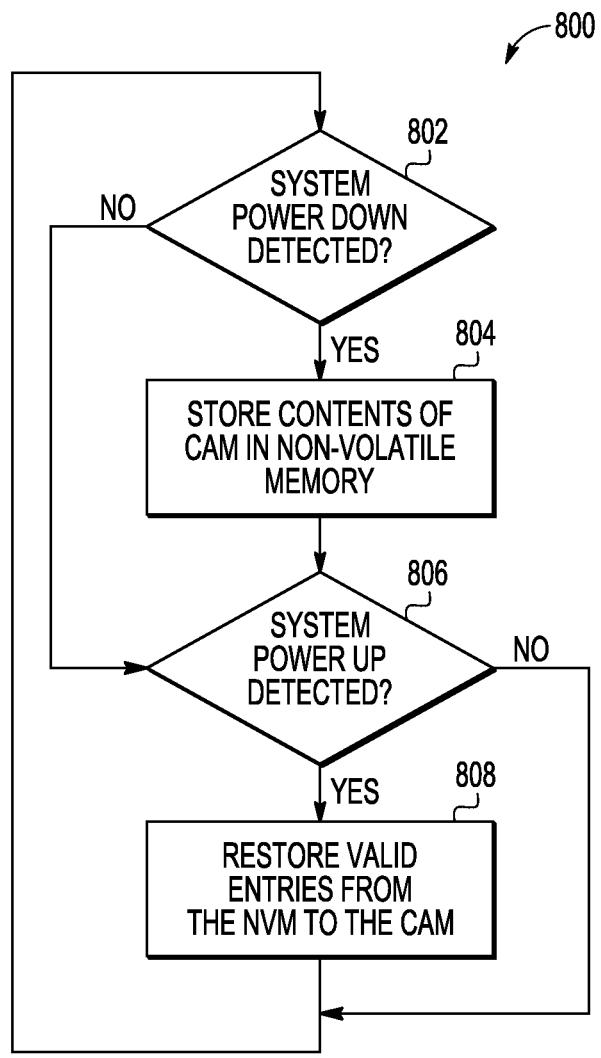
FIG. 8 illustrates an embodiment of a method for saving and restoring entries in CAM during power down and power up modes, usable in embodiments of the system of FIG. 1.

FIG. 8 illustrates an embodiment of a method 800 for saving and restoring entries 402 (FIG. 4) in CAM 108, usable in embodiments of the system of FIG. 1. Process 802 determines whether a system power down has been detected. If a power down is detected, process 804 includes storing the contents of CAM 108 in non-volatile memory, such as flash memory 106 or other suitable non-volatile memory in system 100. If no power down is detected, or process 804 is complete, method 800 transitions to process 806, which includes detecting whether a system power up is detected. If a power up is detected, process 808 restores valid entries from the non-volatile memory to CAM 108. If a power up is not detected in process 806 or power up is detected and process 808 is complete, method 800 transitions to process 802.

By now it should be appreciated that in some embodiments, there has been provided a memory system comprising a memory having a plurality of address locations, each address location configured to store data and one or more error correction bits corresponding to the data, and a content addressable memory (CAM). The CAM includes a plurality of entries, each entry configured to store an address value of an address location of the memory and one or more extended error correction bits corresponding to the data stored at the address location of the memory.

In another aspect, each entry of the CAM can be further configured to store an error correction control value.

In another aspect, the error correction control value identifies a subset of the one or more extended error correction bits and type of error correction code corresponding to the subset of the one or more extended error correction bits.

In another aspect, the method can further comprise a memory controller coupled to the memory and to the CAM, wherein the memory controller, in response to a read access to a first address location of the memory, can be configured to determine if an address value of the first address location matches a valid entry in the CAM. If the address value of the first address location matches a valid entry in the CAM, the one or more extended error correction bits stored in the matching valid entry of the CAM is used to determine if an error is present in the data stored at the accessed address location.

In another aspect, the memory controller, in response to the read access, can be further configured to use the one or more error correction bits stored in the first address location of the memory to determine if an error is present in the data stored at the first address location, if the address value of the first address location does not match a valid entry in the CAM.

In another aspect, the memory controller, in response to the read access, can be further configured to correct the data from the first address location using the one or more error correction bits stored at the first address location and providing the corrected data, if the address value of the first address location does not match a valid entry in the CAM and using the one or more error correction bits stored at the first address location indicates an error is present and the error is correctable with the one or more error correction bits stored at the first address location.

In another aspect, the memory controller, in response to the read access, is further configured to store the address value of the first address location to an available entry of the CAM, if the address value of the first address location does not match a valid entry in the CAM and using the one or more error correction bits stored at the first address location indicates an error is present in the data stored at the first address location and the error is uncorrectable with the one or more error correction bits stored at the first address location.

In another aspect, the memory controller, in response to a write access to a second address location of the memory with corresponding write data, is configured to store the write data to the second address location, determine if an address value of the second address location matches a second valid entry in the CAM, and if the address value of the second address location matches the second valid entry in the CAM, generate one or more extended error correction bits for the write data, and store the generated one or more extended error correction bits in the second valid entry of the CAM.

In another aspect, the memory controller, in response to the write access, can be further configured to generate one or more error correction bits for the write data, and store the generated one or more error correction bits to the second address location of the memory, if the address value of the second address location does not match a second valid entry in the CAM.

In another aspect, the memory controller, in response to the write access, can be further configured to generate one or more error correction bits for the write data, and store the generated one or more error correction bits to the second address location of the memory, if the address value of the second address location matches the second valid entry in the CAM.

In another aspect, each address location of the memory can correspond to one of a page, a sector, or a block of the memory.

In another aspect, the one or more extended error correction bits in the CAM corresponding to data stored at an address location of the memory can be used to correct more bits of error in the data than the one or more error correction bits stored in the memory with the data at the address location.

In another aspect, the memory can be characterized as a nonvolatile memory and the CAM as a random access memory (RAM).

In another aspect, the memory controller can be configured to, in response to a power down request, store valid entries of the CAM to the memory; and in response to a power up request, restore the valid entries from the memory to the CAM.

In other embodiments, in a memory system, a method can comprise receiving a read access to a first address location of a memory. The first address location of the memory stores data and one or more corresponding error correction bits. In response to the read access, the method can determine if the first address location matches a valid entry in a content addressable memory (CAM). If the first address location matches a valid entry in the CAM, one or more extended error correction bits stored in the matching CAM entry can be used to determine if an error is present in the data stored at the first address location. If the first address location does not match a valid entry in the CAM, the one or more error correction bits stored in the first address location of the memory can be used to determine if an error is present in the data stored at the first address location.

In another aspect, the method can further comprise, in response to the read access, if the first address location does not match a valid entry in the CAM and using the one or more error correction bits stored in the first address location determines that an error is present in the data stored at the first address location and the error is uncorrectable with the one or more error correction bits stored at the first address location, storing the first address location to an available entry of the CAM.

In another aspect, the method can further comprise receiving a write access to a second address location of the memory, wherein the write access has corresponding write data. In response to the write access, the write data can be stored to the second address location. If the second address location matches a second valid entry in the CAM, one or more extended error correction bits can be generated for the write data and stored in the second valid entry of the CAM. If the second address location does not match a second valid entry in the CAM, one or more error correction bits for the write data can be generated and stored to the second address location of the memory.

In further embodiments, a memory system can comprise a nonvolatile memory having a plurality of address locations, each address location configured to store data and one or more error correction bits corresponding to the data. A content addressable memory (CAM) can be characterized as a random access memory (RAM) that includes a plurality of entries. Each entry can be configured to store an address value of an address location of the memory and one or more extended error correction bits corresponding to the data stored at the address location of the memory. A memory controller coupled to the memory and the CAM can be configured to, in response to a read access to an address location of the memory, determine if an address value of the address location matches a valid entry in the CAM. If the address value of the address location does not match a valid entry in the CAM, the one or more error correction bits stored at the address location of the memory can be used to determine if an error is present in the data stored at the address location. When an error is present in the data stored at the address location and the error is uncorrectable with the one or more error correction bits stored at the address location, the address value of the address location can be stored to an available entry of the CAM.

In another aspect, the memory controller can be further configured to, in response to a write access to the address location of the memory, generate one or more extended error correction bits corresponding to write data provided with the write access, store the generated one or more extended error correction bits to the available entry of the CAM which stores the address value of the address location, and store the write data to the address location of the memory.

In another aspect, the one or more extended error correction bits stored to the available entry of the CAM can be used to correct a greater number of bit errors in the data than the one or more error correction bits stored at the address location of the memory.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are implemented with circuitry located on a single integrated circuit or within a same device. Alternatively, the systems and subsystems may include any number of separate integrated circuits or separate devices interconnected with each other. For example, RAM 110, ROM 112, CAM 108 and flash memory 106 may be located on a same integrated circuit as processor 102 or on a separate integrated circuit or located within another peripheral or slave discretely separate from other elements of system 100. Peripheral modules 114 may also be located on separate integrated circuits or devices. Also for example, system 100 or portions thereof may be soft or code representations of physical circuitry or of logical representations convertible into physical circuitry. As such, the systems may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the above-discussed embodiments can be implemented by software modules that perform one or more tasks associated with the embodiments. The software modules described herein may be received elements by data processing system 100, for example, from computer-readable storage media such as flash memory 106, CAM 108, RAM 110 and ROM 112 respectively, or other media on other computer systems. Such computer-readable storage media may be permanently, removably or remotely coupled to a data processing system. The computer-readable storage media may include non-transitory computer readable storage media, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like. Other new and various types of non-transitory computer-readable storage media may be used to store the modules discussed herein. Non-transitory computer-readable storage media include all computer-readable media except for a transitory, propagating signal.

In one embodiment, data processing system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, tablets, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The term "bus" is used to refer to a plurality of signals or conductors which may be used to transfer one or more various types of information, such as data, addresses, control, or status. The conductors may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A memory system comprising:
   a memory having a plurality of address locations, each address location configured to store data and one or more error correction bits corresponding to the data; and
   a content addressable memory (CAM), wherein the CAM includes a plurality of entries, each entry configured to store an address value of an address location of the memory and one or more extended error correction bits corresponding to the data stored at the address location of the memory; and
   a memory controller configured to, in response to a power down request, store valid entries of the CAM to the memory, and in response to a power up request, restore the valid entries from the memory to the CAM.

2. The memory system of claim 1, wherein each entry of the CAM is further configured to store an error correction control value.

3. The memory system of claim 2, wherein the error correction control value identifies a subset of the one or more extended error correction bits and type of error correction code corresponding to the subset of the one or more extended error correction bits.

4. The memory system of claim 1, further comprising:
   a memory controller coupled to the memory and to the CAM, wherein the memory controller, in response to a read access to a first address location of the memory, is configured to:
      determine if an address value of the first address location matches a valid entry in the CAM; and
      if the address value of the first address location matches a valid entry in the CAM, using the one or more extended error correction bits stored in a matching valid entry of the CAM to determine if an error is present in the data stored at an accessed address location.

5. The memory system of claim 4, wherein the memory controller, in response to the read access, is further configured to:
   if the address value of the first address location does not match a valid entry in the CAM, using the one or more error correction bits stored in the first address location of the memory to determine if an error is present in the data stored at the first address location.

6. The memory system of claim 5, wherein the memory controller, in response to the read access, is further configured to:
   if the address value of the first address location does not match a valid entry in the CAM and the using the one or more error correction bits stored at the first address location indicates an error is present and the error is correctable with the one or more error correction bits stored at the first address location, correcting the data from the first address location using the one or more error correction bits stored at the first address location and providing the corrected data.

7. The memory system of claim 5, wherein the memory controller, in response to the read access, is further configured to:
   if the address value of the first address location does not match a valid entry in the CAM and the using the one or more error correction bits stored at the first address location indicates an error is present in the data stored at the first address location and the error is uncorrectable with the one or more error correction bits stored at the first address location, storing the address value of the first address location to an available entry of the CAM.

8. The memory system of claim 4, wherein the memory controller, in response to a write access to a second address location of the memory with corresponding write data, is configured to:
   store the write data to the second address location;
   determine if an address value of the second address location matches a second valid entry in the CAM; and
   if the address value of the second address location matches the second valid entry in the CAM, generate one or more extended error correction bits for the write data, and storing the one or more extended error correction bits in the second valid entry of the CAM.

9. The memory system of claim 8, wherein the memory controller, in response to the write access, is further configured to:
   if the address value of the second address location does not match a second valid entry in the CAM, generate one or more error correction bits for the write data, and storing the one or more error correction bits to the second address location of the memory.

10. The memory system of claim 8, wherein the memory controller, in response to the write access, is further configured to:

if the address value of the second address location matches the second valid entry in the CAM, generating one or more error correction bits for the write data, and storing the one or more error correction bits to the second address location of the memory.

11. The memory system of claim 1, wherein each address location of the memory corresponds to one of a page, a sector, or a block of the memory.

12. The memory system of claim 1, wherein the one or more extended error correction bits in the CAM corresponding to data stored at an address location of the memory are used to correct more bits of error in the data than the one or more error correction bits stored in the memory with the data at the address location.

13. The memory system of claim 1, wherein the memory is characterized as a nonvolatile memory and the CAM as a random access memory (RAM).

14. In a memory system, a method comprising:
receiving a read access to a first address location of a memory, wherein the first address location of the memory stores data and one or more corresponding error correction bits;
in response to the read access:
determining if the first address location matches a valid entry in a content addressable memory (CAM);
if the first address location matches a valid entry in the CAM, using one or more extended error correction bits stored in the valid entry in the CAM that matches the first address location to determine if an error is present in the data stored at the first address location; and
if the first address location does not match a valid entry in the CAM, using the one or more error correction bits stored in the first address location of the memory to determine if an error is present in the data stored at the first address location;
if the first address location does not match a valid entry in the CAM and the using the one or more error correction bits stored in the first address location of the memory determines that an error is present in the data stored at the first address location and the error is uncorrectable with the one or more error correction bits stored at the first address location, storing the first address location to an available entry of the CAM.

15. The method of claim 14, further comprising:
receiving a write access to a second address location of the memory, wherein the write access has corresponding write data;
in response to the write access:
storing the write data to the second address location;
determining if the second address location matches a second valid entry in the CAM;
if the second address location matches a second valid entry in the CAM, generating one or more extended error correction bits for the write data and storing the generated one or more extended error correction bits in the second valid entry of the CAM; and
if the second address location does not match a second valid entry in the CAM, generating one or more error correction bits for the write data and storing the one or more error correction bits to the second address location of the memory.

16. A memory system comprising:
a nonvolatile memory having a plurality of address locations, each address location configured to store data and one or more error correction bits corresponding to the data;
a content addressable memory (CAM), wherein the CAM is characterized as a random access memory (RAM), and wherein the CAM includes a plurality of entries, each entry configured to store an address value of an address location of the memory and one or more extended error correction bits corresponding to the data stored at the address location of the memory; and
a memory controller coupled to the memory and the CAM, wherein the memory controller is configured to, in response to a read access to an address location of the memory:
determine if an address value of the address location matches a valid entry in the CAM; and
if the address value of the address location does not match a valid entry in the CAM, using the one or more error correction bits stored at the address location of the memory to determine if an error is present in the data stored at the address location, and when an error is present in the data stored at the address location and the error is uncorrectable with the one or more error correction bits stored at the address location, storing the address value of the address location to an available entry of the CAM.

17. The memory system of claim 16, wherein the memory controller is further configured to:
in response to a write access to the address location of the memory:
generating one or more extended error correction bits corresponding to write data provided with the write access;
storing the one or more extended error correction bits to the available entry of the CAM which stores the address value of the address location; and
storing the write data to the address location of the memory.

18. The memory system of claim 17, wherein the one or more extended error correction bits stored to the available entry of the CAM can be used to correct a greater number of bit errors in the data than the one or more error correction bits stored at the address location of the memory.

* * * * *